United States Patent [19]
Kronick et al.

[11] 3,819,489
[45] June 25, 1974

[54] BACTERIA DETECTOR

[75] Inventors: Melvyn N. Kronick, Stanford, Calif.; James MacLowry; Daniel Bruce, both of Bethesda, Md.

[73] Assignee: The United States of America, as represented by the Secretery of Health, Education and Welfare

[22] Filed: Sept. 9, 1971

[21] Appl. No.: 178,890

[52] U.S. Cl.... 195/127, 195/103.5 R, 250/43.5 MR
[51] Int. Cl............................................. C12k 1/04
[58] Field of Search..... 250/43.5 MR, 71.5 R, 71 R; 23/230 B; 195/103.5 R, 127

[56] References Cited
UNITED STATES PATENTS
2,914,447   11/1959   Levin ........................... 195/103.5 R
3,553,082   1/1971   Hach ............................ 195/103.5 R

OTHER PUBLICATIONS

Benson et al., "Int. J. Appl. Radiation and Isotopes", 17:488–489 (1966).

*Primary Examiner*—Alvin E. Tanenholtz
*Assistant Examiner*—Max D. Hensley

[57] ABSTRACT

A method of automatically screening bio-fluid samples for bacterial contamination. A scintillation vial is fitted with a special top in the shape of a tent made of scintillator plastic. Bacteria present in the sample will feed on carbon-14 glucose releasing carbon-14 dioxide. When the carbon-14 dioxide strikes the scintillator plastic, light flashes will be emitted, enabling the user to detect and count the amount of radiation in a standard automatic scintillation counter.

1 Claim, 2 Drawing Figures

PATENTED JUN 25 1974   3,819,489

INVENTORS
MELVYN N. KRONICK
JAMES MacLOWRY
DANIEL BRUCE
BY Broudy and Neimark
ATTORNEYS

BACTERIA DETECTOR

The present invention relates to a method of detecting bacterial contamination and more particularly to a method of detecting bacterial contamination by counting flashes of light emitted from a scintillation plastic which indicates the presence of bacteria.

There has always existed a dire need for a fast, reliable and precise method for the determination of the presence of bacteria in blood, cerebrospinal fluid (CSF), etc. Often this determination reaches the urgency of life or death for a patient. Prior art procedures not only required laboratory techniques which were time consuming, but ones which involved the use of cultures and the elaborate separation and examination of these cultures.

A minimum of one day is usually required to determine the presence of bacterial growth in blood cultures. However, with the present invention there has been developed a method for the detection of bacterial growth that is fast, objective and sensitive. It is based on the incubation of the cultures in liquid media to which carbon-14 glucose has been added as the sole source of carbohydrate. The evolution of carbon-14 dioxide is measured as an index of bacterial growth, and the vessel disclosed by this invention presents a means for indicating the presence of the carbon-14 dioxide.

The routine diagnosis of bacteremia in liquid culture medium is made by observation of turbidity which is caused by multiplication of bacteria. This phase of bacterial growth follows the lag phase when cell division is not occurring. Although the number of organisms is not increasing during this period, which may last as long as four to five hours, cell metabolism is active, and the organisms are increasing in size. Since most bacteria utilize glucose in one or more metabolic pathways, they can be detected by measuring the release of carbon dioxide, a by-product of glucose metabolism.

For all of the bacteria investigated the patterns of carbon-14 dioxide release have been similar, and for different specimens of the same species the patterns have been nearly identical.

The advantages of this system for detecting bacterial growth are: (a) The method permits the diagnosis of bacteremia and the testing of sensitivity to drugs within hours after the primary culture has been made. Therefore, specific treatment can be instituted earlier. (b) The objective method of detecting bacterial growth eliminates the necessity for repeated visual inspections of blood cultures thus conserving technician time. It also lends itself to automation and the development of equipment which will automatically sample cultures and determine the presence of bacterial growth by the detection of carbon-14 dioxide. (b) The problem often encountered in blood cultures is the loss of fastidious organisms before they can be detected visually. The viability of these bacteria can be maintained if subculturing is performed early enough. The rapidity of this system for bacterial detection makes early subculturing possible.

The present invention, used in conjunction with a standard automatic liquid scintillation counter, is for performing assays of chemical reactions in the liquid phase in which a radioactive gas is evolved. The device is a sealable chamber with a special top made of a scintillator plastic such as New England Nuclear's Pilot B or Nuclear Enterprises' NE102. Scintillating plastics are known in the art and an example composition, that of New England Nuclear's Pilot B, is a mixture of p-terphenyl and p,p'-diphenyl stilbene in a matrix of polyvinyl toluene. A biofluid sample of blood, CSF or the like, a nutrient media, carbon-14 glucose food, and a magnetic stirrer are placed in the bottom portion of the vessel. The stirrer is used to accelerate bacterial growth during incubation. Bacteria present in the sample will feed on the carbon-14 glucose, releasing carbon-14 dioxide as a by-product. The carbon dioxide in the gas phase diffuses rapidly up into the vessel through a hole in the lid, and onto the plastic. As the carbon-14 decays, it causes the scintillation plastic to emit light flashes. The chamber is made of such size as to enable the user to detect and count the light flashes with a standard automatic liquid scintillation counter. The cap and glass bottom of the vessel can be made by modifying a standard Packard scintillation vial, while a silicone rubber diaphragm helps seal the vial airtight. Hence, once the sample is sealed, the chemical, biological, and radiological integrity of the sample is maintained completely. If desirable, the diaphragm may be punctured with a small hole so that reagents may be added to kill or alter the process.

From the above discussion of the theoretical advantages of bacteria detection through the utilization of carbon-14 dioxide, it is obvious that the vessel disclosed by the present invention offers many improvements over prior art devices, and provides a much needed component for the field of bacteria detection.

It is, therefore, a principal object of the present invention to provide for the detection of growth of bacteria in bio-fluids.

It is another object to overcome the deficiencies of the prior art such as indicated above.

Another object of the invention is the provision of a vessel and method for detecting bacteria which utilizes scintillation counting.

Still another object of the invention is the provision of a vessel for bacteria detection which employs a scintillator plastic.

Yet another object of the present invention is the provision of a system for bacterial detection in which the detection can take place in a detector constructed from a standard scintillation vial or in any standard automatic scintillation counter.

Still another object of the present invention is the provision of a bacteria detector which indicates the presence of such bacteria by flashes of light.

A final object of the present invention is the provision of a bacteria detector and method which permits the addition of reagents after the reaction has been started.

Other objects and many of the attendant advantages of this invention will be readily appreciated as the same becomes better understood by reference to the following detailed description of a specific embodiment when considered in connection with the accompanying drawings in which like reference numerals designate like parts throughout the figures thereof and wherein.

Figure 1:
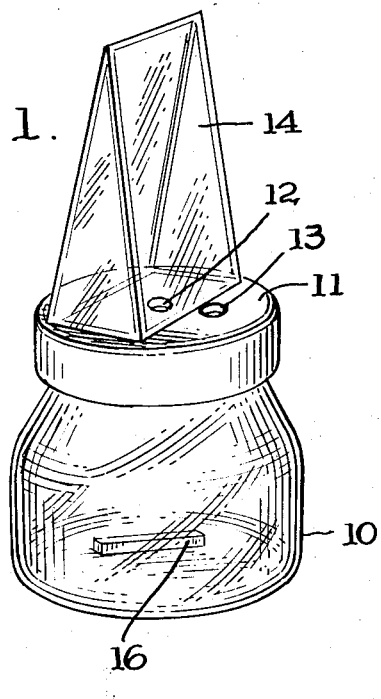
FIG. 1 shows a device in accordance with the present invention.
Figure 2:
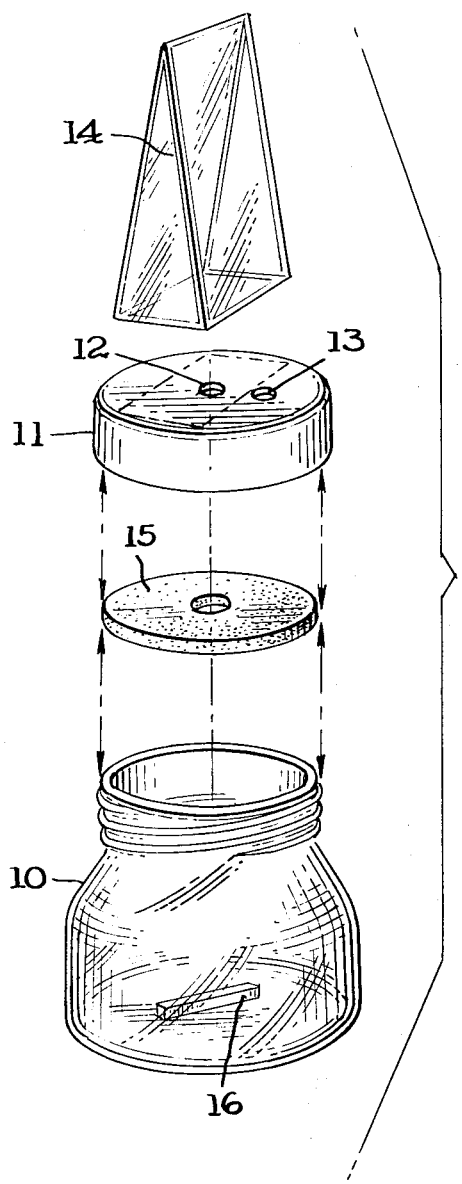
FIG. 2 shows an exploded view of the device of FIG. 1.

Referring now to the drawings, there is shown the vessel used to detect bacterial growth. The vessel has a generally bottle-shaped configuration 10 and is used to hold the blood sample, nutrient media, carbon-14 glucose, and a magnetic stirrer. The bottle 10 has a screw cap 11 which when used with a suitable gasket 15, preferably of silicone rubber, will form an airtight seal with the bottle. At the center of the screw cap 11 there is a gas vent, or hole 12 and at another position nearer the edge of the cap there is another hole 13.

Positioned over the gas vent 12, and tightly sealed to the cap 11 there is a triangular, tent-shaped cover 14 made of a scintillator plastic, such as New England Nuclear's Pilot B or Nuclear Enterprises' NE 102, for example. Hole 13, which, it will be noted, is positioned just beyond the confines of cover 14, is sealed by the silicone rubber gasket 15 so that the airtight seal is kept. Reagents to be added to the bottle 10 may be added with a hypodermic needle through hole 13, puncturing the seal. Similarly, a hypodermic needle may be used through hole 13 to withdraw a portion of the contents of the bottle 10. Magnetic stirrer 16 is placed in the container 10 to stir the contents and increase the rate of growth of any bacteria which may be present.

In carrying out the process of the invention, a sample of bio-fluid such as blood, a nutrient media, and a quantity of carbon-14 glucose is put into the bottle 10. The cap 11 is tightly screwed onto the bottle to provide a sealable, airtight and contamination proof device. As bacteria feeds on the glucose, carbon-14 dioxide is released as a by-product and this gas diffuses throughout the bottle and up through gas vent 12 to the tent-like cover 14 of a scintillation plastic, resulting in a flash of light when particles of the radioactive gas strike the scintillator plastic. These flashes of light may be automatically counted by a scintillation counter such as the Beckman model LS-250 spectrometer, the number of flashes indicating the presence of bacteria.

EXAMPLE

In tests of the method of the present inventions organisms of Escherichia coli and Staphylococcus aureus were suspended in approximately 1 ml. nutrient media which may be either thioglycollate medium without dextrose or trypticase soy broth. A total amount of $0.5\mu$ Ci of radioactive glucose was added. This mixture was placed into the container and sealed. Nuclear Chicago or Packard Tri-Carb scintillation counters were used to detect scintillation. The bacteria was deemed to have been detected when the count rate became twice that of background. Table I shows the relationship between the number of organisms in the inoculum and the time for detection.

TABLE I

| No. of Organisms | Time for Detection in Hours |
|---|---|
| 350 | 7 |
| 7000 | 4 |
| $10^6$ | <1 |
| $5 \times 10^7$ | ½ |

When using a sample of blood or other bio-fluid approximately 1 ml. of blood and 1 ml. of nutrient broth is used with a trace of carbon-14 glucose ($\approx 0.5\mu$ Ci). Effectiveness is substantially enhanced when a magnetic stirrer is used as this increases the rate of growth of the bacteria.

From the above description of the structure and operation of the invention, it is obvious that the bacteria detector disclosed offers many improvements over the shortcomings and weaknesses of prior devices. The device is relatively inexpensive to fabricate, easy to use, and a quick and reliable indication of the presence of bacteria in bio-fluids, the method providing this indication much faster than similar detectors.

Obviously, many modifications and variations of the present invention are possible in the light of the above teachings. It is therefore to be understood that within the scope of the appended claims, the invention may be practiced otherwise than as specifically described.

What is claimed is:

1. A device for detecting the evolution of radioactive gases, comprising a container, a sealable cap thereon, a gas vent in said cap, and a tent-like cover of scintillator plastic surrounding said gas vent and attached to said cap, wherein said cap has a second aperture therethrough outside said tent-like cover and communicating with said container, and wherein the device further includes a gasket positioned between said cap and said container and sealing said second aperture, said gasket having a hole therethrough communicating with said gas vent on said cap thereby leaving an open channel between said container and said tent-like cover, whereby said gasket acts as a seal between said second aperture and said container and reactants may be injected therethrough without releasing the seal.

* * * * *